(12) United States Patent
Jiang et al.

(10) Patent No.: US 11,696,584 B2
(45) Date of Patent: Jul. 11, 2023

(54) STREPTOMYCES ANTIOXIDANS AND ITS USE IN PREVENTION AND TREATMENT OF PLANT DISEASES

(71) Applicant: Zhejiang Normal University, Jinhua (CN)

(72) Inventors: Donghua Jiang, Jinhua (CN); Xin Guo, Jinhua (CN); Jingjing Ma, Jinhua (CN); Jingjing Zhang, Jinhua (CN); Zhipeng He, Jinhua (CN)

(73) Assignee: Zhejiang Normal University, Jinhua (CN)

( * ) Notice: Subject to any disclaimer, the term of this patent is extended or adjusted under 35 U.S.C. 154(b) by 0 days.

(21) Appl. No.: 17/544,717

(22) Filed: Dec. 7, 2021

(65) Prior Publication Data
US 2022/0174959 A1     Jun. 9, 2022

(30) Foreign Application Priority Data
Dec. 7, 2020 (CN) .......................... 202011427324.5

(51) Int. Cl.
*A01N 63/28* (2020.01)
*A01P 3/00* (2006.01)
*A01P 1/00* (2006.01)

(52) U.S. Cl.
CPC ................ *A01N 63/28* (2020.01); *A01P 1/00* (2021.08); *A01P 3/00* (2021.08)

(58) Field of Classification Search
CPC .......... C12N 1/20; C12N 1/205; A01N 63/28; A01P 1/00; A01P 3/00
See application file for complete search history.

(56) References Cited

PUBLICATIONS

Hao et al., "Inhibition of Tomato Early Blight Disease by Culture Extracts of a *Streptomyces puniceus* Isolate from Mangrove Soil", Phytopathology Jul. 2019;109(7):1149-1156 (Year: 2019).*
Law et al., "Diversity of Streptomyces spp. from mangrove forest of Sarawak (Malaysia) and screening of their antioxidant and cytotoxic activities", Scientific Reports (2019) 9:15262 (Year: 2019).*
Liu et al., "Antifungal, Plant Growth-Promoting, and Genomic Properties of an Endophytic Actinobacterium *Streptomyces* sp. NEAU-S7GS2" Front Microbiol. 2019; 10: 2077. (Year: 2019).*
Ser et al., "*Streptomyces antioxidans* sp. nov., a Novel Mangrove Soil Actinobacterium with Antioxidative and Neuroprotective Potentials", Front. Microbiol., Jun. 16, 2016, https://doi.org/10.3389/fmicb.2016.00899 (Year: 2016).*

* cited by examiner

*Primary Examiner* — Ruth A Davis
(74) *Attorney, Agent, or Firm* — Bochner IP, PLLC; Andrew D. Bochner (57) ABSTRACT

The present disclosure discloses a *Streptomyces antioxidans* strain Sa-21, namely, strain Sa-21 with an accession number of CCTCC NO: M 2020423. The present disclosure also discloses the use of the aforementioned *Strepiomyces antioxidans* strain Sa-21 in inhibition of *Alternaria solani* (*A. solani*). The *Streptomyces antioxidans* strain also has an inhibiting effect on both plant pathogenic fungi and plant pathogenic bacteria.

3 Claims, 5 Drawing Sheets
Specification includes a Sequence Listing.

STREPTOMYCES ANTIOXIDANS AND ITS USE IN PREVENTION AND TREATMENT OF PLANT DISEASES

CROSS REFERENCE TO RELATED APPLICATION

This patent application claims the benefit and priority of Chinese Patent Application No. 202011427324.5 filed with China National Intellectual Property Administration on Dec. 7, 2020, the disclosure of which is incorporated by reference herein in its entirety as part of the present application.

TECHNICAL FIELD

The present disclosure belongs to the field of microbial prevention and treatment, and relates to *Streptomyces antioxidans* strain Sa-21 antagonizing *Alternaria solani* and its use in the prevention and treatment of plant diseases.

BACKGROUND

Tomato early blight is a disease caused by infection of *Alternaria solani*. It is a serious disease that occurs on stem, leaf and fruit of the plant. In normal years, this disease can cause yield reduction of tomato by 10% to 30%, and in epidemic years, tomato yield loss can reach 30% to 40%. This pathogen can also cause diseases in crops such as potato, pepper, and eggplant.

At present, strengthening field management and spraying fungicides remain the principal prevention and treatment measures against the tomato early blight. The use of beneficial microorganisms such as yeast, bacillus, actinomycetes, etc. to prevent and control tomato early blight has the advantages of healthy, environment friendly and pollution-free, and has attracted the attention of many scientific researchers. Actinomycetes are important biological resources for production of agricultural antibiotics, and they have promising application prospects in the biological control of plant diseases. About 70% of the widely used antibiotics are produced by various *streptomyces*, such as streptomycin, oxytetracycline, tetracycline, chloramphenicol, and erythromycin.

The patent application No. 2013100080285, titled Use of metabolites of *Streptomyces sioyaensis* in Controlling Bean Anthracnose discloses a strain of *Streptomyces sioyaensis* 107, which has an inhibiting effect on pathogens such as *Colletotrichum lindemuthianum* and *Alternaria solani*.

The patent application No. 2014106916331, titled Biological control of *Streptomyces* and use thereof discloses *Streptomyces* sp. Lnu-12, which has the strongest inhibiting effect on *Fusarium oxysporum*, a strong inhibiting effect on tomato leaf mould and *Alternaria solani*, and a somewhat inhibiting effect on root rot bacteria of *Capsicum annuum*.

Chinese patent application No. 2014101527708, titled *Streptomyces Albidoflavus* and its use in control of plant disease discloses a strain of *Streptomyces albidoflavus* SY-FX-14, and the strain of *Streptomyces albidoflavus* SY-TX-14 has a significant inhibiting effect on growth of the pathogens for white cantaloupe melon rot, pepper fusarium wilt, tomato early blight, anthracnose of cucumber, cotton wilt, cucumber gray mould, rice bakanae, tomato bacterial wilt, rice sheath blight, tobacco black shank, wheat root rot, rice blast disease, wheat scab, rape sclerotinia sclerotiorum, soybean root rot, tomato gray mould, cucumber brown spot disease and cucumber downy mildew.

Chinese patent application No. 201710191.3010, titled A biocontrol agent for *Streptomyces cacaoi* and use thereof discloses *Streptomyces cacaoi* FN. *Streptomyces cacaoi* FN can be used to control apple anthracnose (leaf blight), apple alternaria leaf spot, cucumber gummy stem blight, cucumber seedling wilt, and tomato early blight.

SUMMARY

In view of the problems in the prior art, the present disclosure provides a strain of *Streptomyces antioxidans* Sa-21 and its use, and the *Streptomyces antioxidans* strain Sa-21 is very antagonistic against the *Alternaria solani*.

In order to solve the existing problems, the present disclosure provides a *Streptomyces antioxidans* strain Sa-21 deposited with China Center for Type Culture Collection (CCICC) under the accession number of CCTCC NO: M 2020423.

The present disclosure also provides the use of the *Streptomyces antioxidans* strain Sa-21 in inhibition of *Alternaria solani* (*A. solani*).

As an improvement of the present disclosure, the *Streptomyces antioxidans* strain Sa-21 has an inhibiting effect on both plant pathogenic fungi and plant pathogenic bacteria.

As a thrther improvement of the present disclosure, the plant pathogenic fungi are selected from the group consisting of *Fusarium solani*, *Fusarium oxysporum* f. sp. *momordicae*, *Botryosphaeria berengeriana* f. sp. *piricoia*, and *Colletotrichum lagenerium*.

The plant pathogenic bacteria is selected from the group consisting of *Pseudomonas syringae* pv. *tomato*, *Xanthomonas campestris* pv. *glycines*, *Pseudomonas syringae* pv. *glycinea*, *Xanthomonas oryzae* pv. *oryzicola*, *Xanthomonas campestris* pv. *campestris*, *Ralstonia solanacearum*, *Pseudomonas syringae* pv. (*tabaci*, *Xanthomonas otyzae* pv. *oryzae*.

In view of the problems arising in chemical prevention and treatment and agricultural control over time, biocontrol of tomato early blight by using microorganisms and their secondary metabolites has become a research direction.

The deposit information of the strain is as follows: deposit name: *Streptomyces antioxidans* Sa-21, depositary authority: China. Center for Type Culture Collection (CCTCC), address of depositary authority: Wuhan University, Wuhan, China; accession number (CCTCC No.): M 2020423, deposit date: Aug. 14, 2020.

The strain Sa-21 of the present disclosure is obtained from the rhizospheric soil of *Cinnamomum camphora*. Based on the morphological characteristics, physiological and biochemical characteristics and 16S rDNA sequence, it is thus identified as the *Streptomyces antioxidans*. That is, in the present disclosure, the *Streptomyces* strain with dramatic antagonism to *Alternaria solani* (*A. solani*) from rhizospheric soil of *Cinnamomuin camphora* is screened out to provide a strain having a biocontrol effect for the biological control of tomato early blight.

Figure 5:
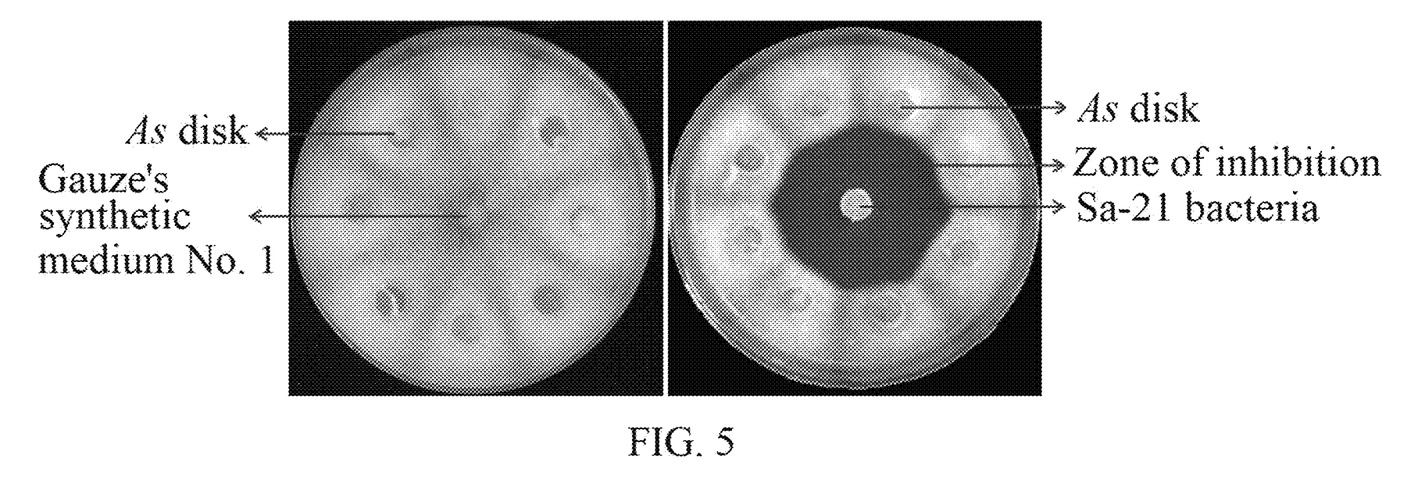
FIG. 5 shows the inhibiting effect of Streptomyces strain Sa-21 on the growth of *Alternaria solani* (*A. solani*).
Figure 6:
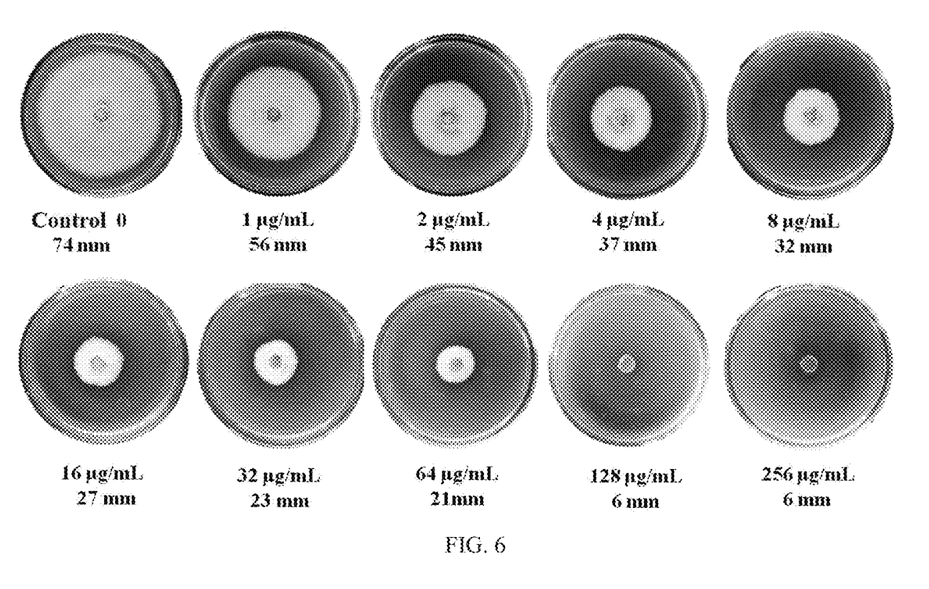
FIG. 6 shows the inhibiting effect of primary crude extract with different concentrations of *Streptomyces* strain Sa-21 on the growth of *Alternaria solani* (*A. solani*).

The fermentation filtrate of *Streptomyces antioxidans* strain Sa-21 has a significant inhibiting effect on *Alternaria solani* and can be used to prevent tomato early blight. The strain Sa-21 was cultured in the Gauze's synthetic medium No. 1 for 5 days at a temperature of 28° C., and a 6 mm antimicrobial disk (a small piece of solid culture medium containing bacteria) was taken and detected for inhibiting effect on *Alternaria solani* (*A. solani*), diameter of the zone of inhibition was as big as about 50 mm (FIG. 5), and the minimum inhibitory: concentration for the crude extract of the strain Sa-21 was 128 µg/mL (FIG. 6). The results for the antibacterial spectrum test showed that the fermentation filtrate of *Streptomyces* strain Sa-21 had a certain inhibiting effect on four representative plant pathogenic fungi of *Fusarium solani*, *Fusarium oxysporum* f. sp. *momordicae*, *Botryosphaeria berengeriana* f. sp. *piricoia*, and *Colletotrichum lagenerium* (see Table 3). It has a strong inhibiting effect on 8 kinds of plant pathogenic bacteria such as *Xanthomonas campestris* pv. *glycines*, *Xanthomonas oryzae* pv. *otyzicola*, and *Pseudomonas suringae* pv. *glycinea* (see Table 4). The 10-fold diluted solution of the fermentation filtrate of the strain Sa-21 has a control efficacy of more than 90% on tomato early blight (see Table 5). *Streptomyces* strain Sa-21 can provide an excellent strain for developmental of microbial-deprived pesticides, and has good prospects in biological control crops such as tomato, rice, and soybean.

BRIEF DESCRIPTION OF THE DRAWINGS

The specific embodiments of the present disclosure will be further described in detail below in combination with the accompanying drawings.

The left panel is the 6 mm Gauze's synthetic medium No. 1 (control), right panel is the 6 mm Sa-21 antimicrobial disk (5 day of incubation time).

DETAILED DESCRIPTION OF THE EMBODIMENTS

The present disclosure will be further described in conjunction with specific embodiments, but the protection scope of the present disclosure is not limited thereto.

Example 1

Screening and Identification of the *Streptomyces antioxidans* Strain Sa-21

Strain

Actinomycete strain: Actinomycete strain was isolated, purified, screened and identified from the soil of different habitats (for example: paddy field. soil, lawn soil, *Cinnamonnan camphora* field soil, tomato field soil, etc.), and the preserving actinomycete strain was deposited.

*Alternaria solani* (abbreviated as "*As*" hereinafter) is a conventional strain.

Medium

Gauze's synthetic solid medium No.1: soluble starch 20 g, $KNO_3$ 1 g, $K_2HPO_4$ 0.5 g, $MgSO_4 \cdot 7H_2O$ 0.5 g, NaCl 0.5 g, $FeSO_4 \cdot 7H_2O$ 0.01 g, agar 20 g, water 1000 mL, pH 7.2-7.4. For use in isolation, purification and identification of the actinomycete strain.

Gauze's synthetic broth medium No. 1: no agar was added, and the rest of the formula was the same as (1), for use in liquid fermentation and culturing of the actinomycete strain.

PDA culture medium: potato extract powder 6 g, glucose 20 g, agar 20 g, water 1000 mL, pH 6.0-6.5, for use in cultivation of *As*.

Experimental Methods 3.1 Isolation, Purification and Deposit of the Actinomycete Strain One gram of dry soil sample was added in 99 mL of sterile water and shaken on a shaker at 120 r/min for 30 min. The supernatant was serially diluted ($10^{-2}$-$10^{-5}$), and 100 μL of diluted solution having an appropriate concentration ($10^{-4}$) was selected uniformly coated on a plate of Gauze's synthetic medium No. 1, and cultured at 28° C. for 5-7 days in an incubator until colonies appeared. Single colonies having typical characteristics of the actinomycetes were picked and transferred to another plate carrying Gauze's synthetic medium No. 1. After 3 runs of purification by streak culturing, a pure strain was obtained. The strain was numbered and stored placed in a refrigerator at 4° C. for later use.

3.2 Screening of Antagonistic *As* Actinomycete Strain 3.2.1 Preliminary Screening by Co-Culture Method The *As* strain was inoculated in PDA culture medium in the plate, one *As* disk (diameter 6 mm) was punched with a puncher after activation and culturing and inoculated in PDA culture medium, cultured for 4 days and left for later use. The screened antimicrobial disk (diameter 6 mm) of the actinomycete strain was inoculated in the middle of the PDA culture medium, with antimicrobial disk of the actinomycete strain surrounded by eight As disks (diameter 6 mm) equidistantly around. The resulting PDA culture medium was cultured at 28° C. for 5-7 days, until hyphae grew all over the petri dish containing the control medium (in which 8 *As* disks were equidistantly inoculated around, but actinomycete cake was not inoculated), and the zone of inhibition was measured. Based on the presence and on the size of zone of inhibition, the actinomycete strain with an antagonistic effect was initially screened out.

3.2.2 Re-Screening by Oxford Cup Method

Eight *As* disks was uniformly inoculated on the edge of the PDA culture medium, with an Oxford cup intervening in the middle of the PDA culture medium. Two hundred microliter of fermentation filtrate of actinomycetes was injected, and Gauze's synthetic broth medium No. 1 was used a blank control. The samples were allowed to stand still and incubated for 4 days; and the experiment was repeated 3 times. Based on the size of the zone of inhibition, the actinomycete strains with stronger antagonism were selected. And the resulting strains were preserved in 25% glycerin.

3.3 Determination of Minimum Inhibitory Concentration of Crude Extract 3.3.1 Preparation of Crude Extract The method for preparing strain fermentation broth (Sa-21 strain fermentation broth) was conducted as follows.

The strain (Sa-21 strain) were inoculated in Gauze's synthetic solid medium No. 1 by streaking and cultured for 5 days. Two antimicrobial disks (diameter 6 mm) of the strain (Sa-21 strain) were inoculated in 100 mL of Gauze's synthetic broth medium No. 1 contained in a 250 mL conical flask, and the resulting culture mixture was cultured for 72 hours at 28° C. under conditions of initial pH value of 7.4 and rotation speed of 160 r/min to give a seed liquid. And the seed liquid was inoculated in Gauze's synthetic broth medium No. 1 (1000 mL of Gauze's synthetic broth medium No. 1 contained in a 3000 mL specification conical flask) and cultured for 7 days under the same conditions to give the fermentation broth.

The resulting fermentation broth (the Sa-21 fermentation broth) was suction filtered by a vacuum pump at room temperature to give a filtrate, and the filtrate was further treated with a 0.22 μm filter membrane and the resulting filtrate was extracted with an equal volume of ethyl acetate, until the upper ethyl acetate layer became colorless. The obtained ethyl acetate layers were combined and evaporated at 50° C. on a rotation evaporator till the dryness of concentrated acid to give a crude ethyl acetate extract of the strain fermentation broth (Sa-21 strain fermentation broth).

3.3.2 Determination of Minimum Inhibitory Concentration of Crude Extract

The As disk (6 mm) was inoculated in the middle of PDA culture medium with different concentrations of crude extract (concentration was 1, 2, 4, 8, 16, 32, 64, 128, and 256 μg/mL, respectively) and cultured for 5 days (temperature was 28° C.), and, with the PDA culture medium without adding crude extract used as a blank control. The diameter of the colonies was measured, and the measurement was repeated 3 times. The concentration of the crude extract at which As did not grow was determined as the minimum inhibitory concentration of crude extract.

The concentrations of the crude extract in the PDA culture medium was shown in FIG. 6, which were 1, 2, 4, 8, 16, 32, 64, 128, and 256 μg/mL, respectively.

3.4 Identification of Antagonistic As Actinomycetes Strain Sa-2

3.4.1 Observation of Morphological Characteristics

The colony size, shape, texture, surface and other characteristics were observed. The strain Sa-21 was cultured by an insertion method and an embedding method, and the intrabasal hypha, aerial hypha and sporotrichial of Sa-21 strain at different culture time (3 days, 5 days, 7 days, and 9 days) were observed under optical microscope and scanning electron microscope for morphological features, and pictures were taken.

3.4.2 Physiological and Biochemical Characteristics Experiment

The Sa-21 strain was tested for starch hydrolysis, gelatin liquefaction, casein hydrolysis, urea utilization, and carbon and nitrogen source utilization.

3.4.3 Sequence Analysis of 16S rDNA

The genomic DNA of the target strain was extracted, and the 16S rDNA sequence was amplified and sent to Sangon Biotech Company for sequencing. The 16S rDNA sequence (SEQ ID NO: 1) obtained by sequencing was submitted to GenBank and analyzed by BLAST comparison. The Neighbor-Joining method in MEGA-X software was used to construct a phylogenetic tree to determine the species of actinomycetes.

Experimental Results 4.1 Obtaining of Pure Strains of Actinomycetes

Figure 1:
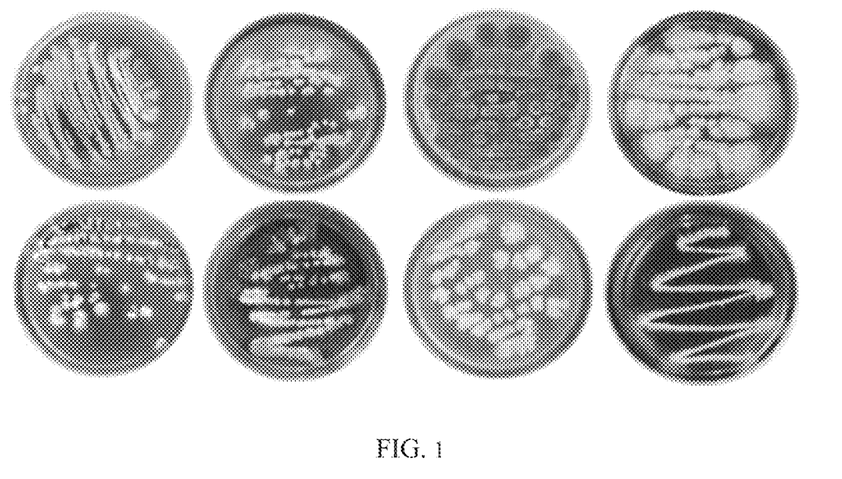
FIG. 1 shows the colony morphology of 8 representative pure actinomycete strains (Gauze's synthetic medium No. 1, 7 days).

Through isolation and purification, 138 strains of actinomycetes were isolated and purified from soil samples from different habitats. Eight representative pure strains of actinomycetes were cultured in pure Gauze's synthetic medium No. 1 for 7 days and the colonies are shown in FIG. 1.

4.2 Screening of Antagonistic As Actinomycete Strain

The co-cultivation method and Oxford cup method were used to screen 138 pure strains of actinomycetes for the primary screening and re-screening of the inhibiting effects on As. The results showed that the effects of different actinomycete strains on As were quite different. After screening, one strain of actinomycete with strong antagonism was obtained, which as designated as strain Sa-21. The diameter of zone of inhibition for the 6 mm antimicrobial disk reached 50±2.4 mm, and the strain Sa-21 was isolated from rhizospheric soil of Cinnamomum amphora.

The strain Sa-21 was deposited, and the deposit information was as follows: deposit name: Streptomyces antioxidans Sa-21, depositary authority: China Center for Type Culture Collection, address of depositary authority: Wuhan University, Wuhan, China, accession number: CCTCC NO: M 2020423, deposit date: Aug. 14, 2020.

4.3 The Minimum Inhibitory Concentration of Crude Extract of Sa-21 Strain Against As PDA culture media containing Sa-21 strain and crude extract of different concentrations were prepared, and the minimum inhibitory concentration of crude extract was determined. The results are shown in FIG. 6. As the concentration of crude extract increased, the diameter of the As colonies became smaller, and the control colony had a diameter of 74 mm. When the concentration of the crude extract reached 128 μg/mL, the As growth was completely inhibited. The minimum inhibitory concentration of crude extract of Sa-21 strain against As was 128 μg/mL.

4.4 Results for Identification of Sa-21 Strain

Figure 2:
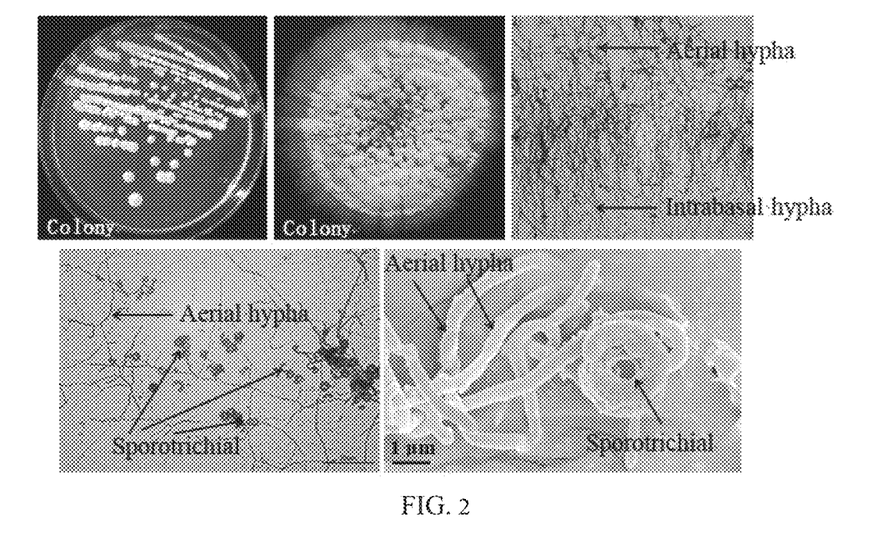
FIG. 2 shows the characteristics of the colony and microscopic morphology of the *Streptomyces* strain Sa-21.

Morphological characteristics of the Sa-21 strain: Sa-21 strains were cultivated on Gauze's synthetic medium No. 1 at 28° C. for 7 days, the colony was small and the colony surface was white and velvety. Observation under microscope showed slender substrate mycelia and aerial hyphae, and the mature aerial hyphae differentiated to form sporotrichial which had a helical shape (FIG. 2).

Figure 3:
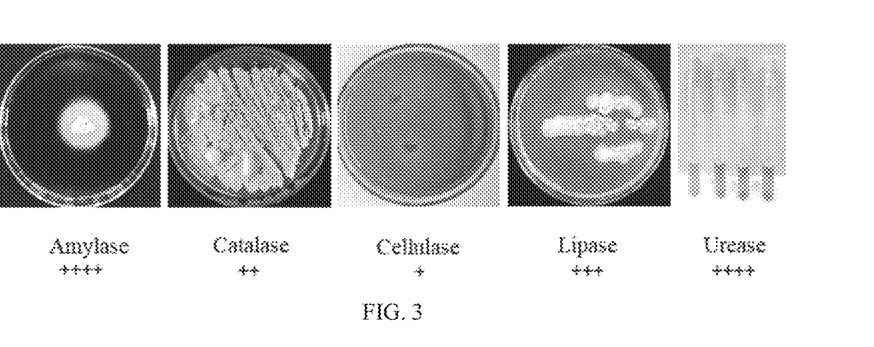
FIG. 3 shows results of the physiological and biochemical experiments for *Streptomyces* strain Sa-21.

The physiological and biochemical test results shows that Sa-21 strain was gram-positive and capable of hydrolyzing starch, fat, gelatin, urea and casein (Table 1, FIG. 3). A variety of nitrogen sources could be used, and the preferred nitrogen source was peptone, potassium nitrate and various amino acids. A variety of carbon sources could be used, and the preferred carbon source was rhamnose, maltose, raffinose, etc. (Table 2). Suitable salt concentration was 1%, suitable pH value was pH 7.0-8.0, and suitable cultivation temperature was 28° C.

TABLE 1

Results for physiological and biochemical test of Streptomyces strain Sa-21

| Test item | Test result | Test item | Test result |
|---|---|---|---|
| Starch hydrolysis | ++++ | Hydrogen sulfide production | − |
| Cellulose hydrolysis | + | Melanin production | − |
| Gelatin Liquefaction | +++ | Catalase | ++ |
| MR Experiment | − | Urease | ++++ |
| V-P Experiment | − | Lipase | +++ |

Note: ++++ represents very strong, +++ represents strong, ++ represents moderately strong, + represents weak, − represents not available.

TABLE 2

Results for carbon source and nitrogen source utilization tests of Streptomyces strain Sa-21

| Type of carbon source | Test result | Type of nitrogen source | Test result |
|---|---|---|---|
| α-lactose | +++ | Peptone | +++ |
| D-rnaltose | +++ | KNO$_3$ | +++ |
| D-xylose | + | (NH$_4$)$_2$SO$_4$ | ++ |
| Sucrose | + | Glutamate | − |
| L(+)-rhamnose | +++ | Methionine | + |
| Raffinose | +++ | Lysine | +++ |
| L(−)-arabinose | + | Leucine | +++ |

TABLE 2-continued

Results for carbon source and nitrogen source utilization tests of Streptomyces strain Sa-21

| Type of carbon source | Test result | Type of nitrogen source | Test result |
|---|---|---|---|
| Inositol | +++ | Histidine | +++ |
| D-mannitol | +++ | | |

Note: +++ represents vigorous growth, ++ represents good growth, + represents moderate growth, − represents no growth.

Figure 4:
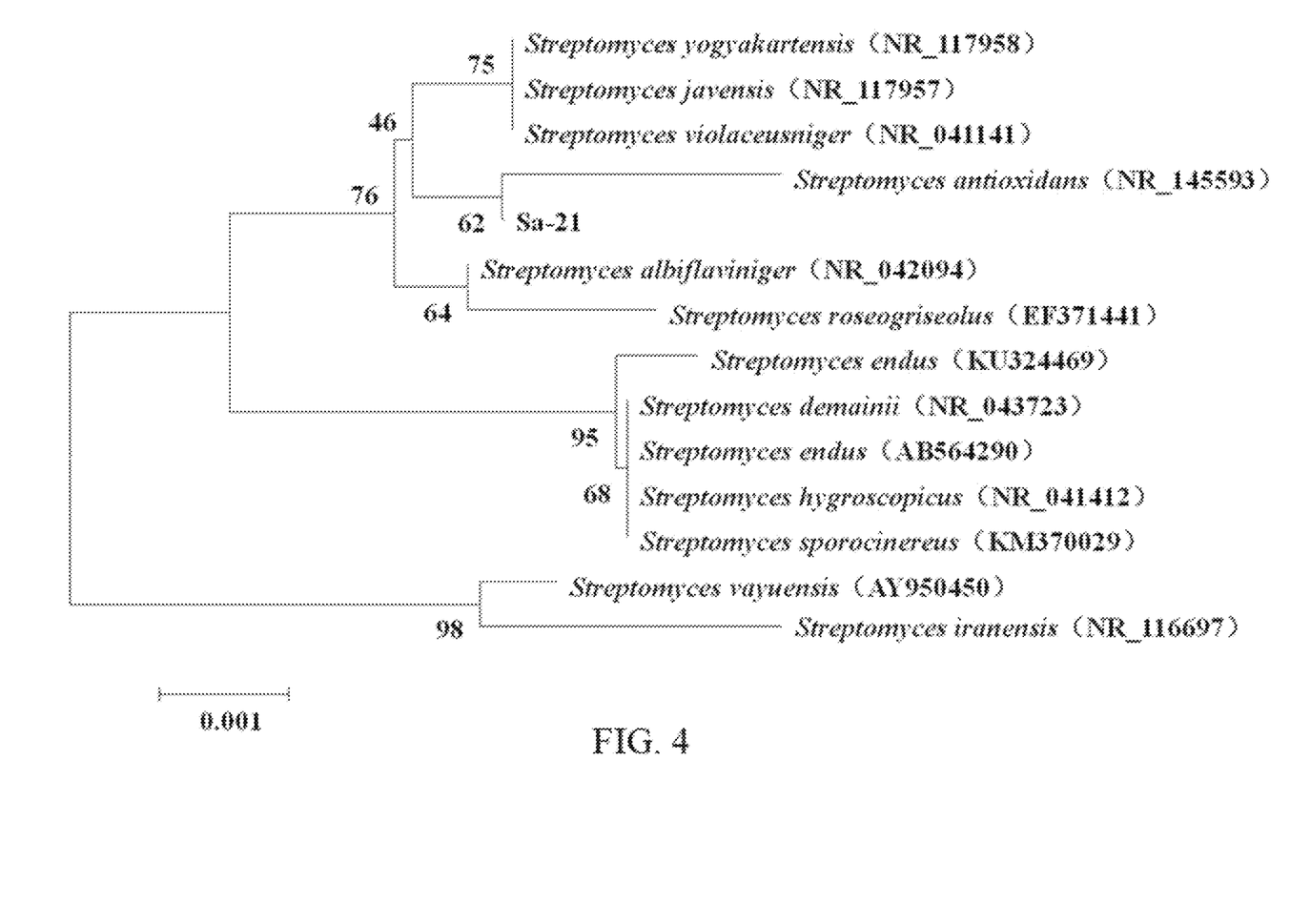
FIG. 4 is a phylogenetic tree of *Streptomyces* strain Sa-21 constructed based on the 16S rDNA sequence.

The results for sequence analysis of 16S rDNA showed that the sequence length was 1406 bp, which was the closest to the evolutionary distance of *Streptomyces antioxidans* (FIG. 4), with a similarity of 99.6%.

Based on the morphological characteristics, results of physiological and biochemical tests and the 16S rDNA sequences for the strain Sa-21, combining key to species for *Streptomyces* and phylogenetic analysis, the strain Sa-21 was identified as *Streptomyces antioxidans*.

Example 2

Determination of Antibacterial Spectrum of the Fermentation Filtrates of *Streptomyces antioxidans* Strain Sa-21 Strain

*Streptomyces antioxidans* strain Sa-21; accession number: CCTCC NO: M 2020423.

Four representative plant pathogenic fungi: *Fusarium solani*, *Fusarium agsporum* f. sp. *momordicae*, *Bonyosphaeria berengeriana* f. sp *piricola*, *Colietotrichum lagenerium*. These four representative plant pathogenic fungi were used to determine the antifungal spectrum of the fermentation filtrate of Sa21 strain.

Eight representative plant pathogenic bacteria: *Pseudomonas syringae* pv. *tomato*, *Xanthomonas campestris* pv. *Pseudomonas syringae* pv. *glycinea*, *Xanthomonas oryzae* pv. *oryzicola*, *Xanthomonas campestris* pv. *campestris*, *Ralstonia solanacearum*, *Pseudomonas syringae* pv. *tabaci*, and *Xanthomonas oryzae* pv. *oryzae*. These eight representative plant pathogenic bacteria (Table 4) were used to determine the antibacterial spectrum of the fermentation filtrate of the Sa-21 strain.

Medium

PDA culture medium: potato 200 g, glucose 20 g, agar 20 g, water 1 L, pH 6.0-6.5. Used for culturing of plant pathogenic fungi.

Beef extract peptone medium: beef extract 3 g, peptone 10 g, NaCl 5 g, water made up to 1000 mL, pH adjusted to 7.5 (for solid medium of beef extract peptone agar, 18 g of agar powder was additionally added). The Beef extract peptone medium was used for culturing of plant pathogenic bacteria.

Gauze's synthetic medium No. 1: Used as fermentation seed for Sa-21 and used for fermentation culture.

Experimental Methods 3.1 Preparation of Fermentation Filtrate of Strain Sa-21

The strain Sa-21 were inoculated in Gauze's synthetic solid medium No. 1 by streaking and cultured for 5 days. Two antimicrobial disks (diameter 6 mm) of the strain (Sa-21 strain) were inoculated in 100 mL of Gauze's synthetic broth medium No. 1 contained in a 250 mL specification conical flask, and the initial pH value was 7.4. The resulting culture mixture was cultured at a constant temperature of 28° C., for 7 days under vibration. The fermentation broth was placed in 50 mL centrifuge tube and centrifuged for 10 minutes at 12000 r/min, and the resulting supernatant was filtered through a. 0.22 μm organic membrane to remove residual spores, giving a fermentation filtrate.

3.2 Activation and Culturing of Plant Pathogenic Fungi

The four pathogenic thngi stored at 4° C. were respectively inoculated into PDA culture medium, and the resulting mixture was activated and cultured at 28° C. for 3 days. Then culture liquid was transferred to a new PDA culture medium and cultured at 28° C. for 5 days, and the resulting culture liquid was used for the determination of antibacterial spectrum of the fungi.

3.3 Activation and Culturing of Plant Pathogenic Bacteria

The eight pathogenic fungi stored at 4° C. were respectively inoculated in beef extract culture medium, and the resulting mixture was activated and cultured at 28° C. for 2 days. Then culture liquid was transferred to a new beef extract peptone culture medium and cultured at 28° C. for 2 days, and the resulting culture liquid was used for the determination of antibacterial spectrum of the bacteria.

3.4 Determination of Antifungal Spectrum of Strain Sa-21

Eight plant pathogenic disks (6 mm) were taken for each species of plant pathogenic fungi and were uniformly inoculated on the edge of the PDA culture medium, and an Oxford cup was inserted in the middle of the PDA culture medium. Into the Oxford cup was injected 200 μL of fermentation filtrate of actinomycete (i.e., the resulting fermentation filtrate in step 3.1), with Gauze's synthetic broth medium No.1 used as a blank control. The fermentation filtrate of actinomycete was cultured for 4 days, and the zone of inhibition was measured using a cross method. The measurements were repeated three times to give an average value.

3.5 Determination of Antibacterial Spectrum of Strain Sa-21

The 8 species of plant pathogenic bacteria were inoculated peptone beef extract broth, activated and cultured in a shaker (180 r/min, 28° C.). When the bacterial density reached $OD_{600}$ of 0.6, 100 μL, of culture was withdrawn and uniformly coated on beef extract peptone solid medium. Another 200 μL of fermentation filtrate of strain Sa-21 was withdrawn and measured by the Oxford cup method for the inhibiting effect of Sa-21 fermentation broth against 8 species of plant pathogenic bacteria.

Experimental Results 4.1 Inhibiting Effect of Fermentation Filtrate of Strain Sa-21 on Four Species of Plant Pathogenic Fungi The results showed that fermentation filtrate of strain Sa-21 had good inhibiting effect on 4 representative plant pathogenic fungi of *Fusarium solani*, *Fusarium oxysporum* f. sp. *momordicae*, *Botryosphaeria berengeriana* f. sp. *piricola*, and *Colletotrichum lagenerium* (see Table 3).

TABLE 3

Inhibiting effect of fermentation filtrate of *Streptomyces* strain Sa-21 on 4 species of plant pathogenic fungi

| 4 plant pathogenic fungi | Zone of inhibition (mm) |
|---|---|
| *Fusarium solani* | 29.3 ± 1.5 |
| *Fusarium oxysporum* f. sp. *momordicae* | 25.8 ± 1.8 |
| *Botryosphaeria berengeriana* f. sp. *piricola* | 25.3 ± 1.3 |
| *Colletotrichum lagenerium* | 25.3 ± 1.3 |

4.2 Inhibiting Effect of Fermentation Filtrate of *Streptomyces* Strain Sa-21 on 8 Species of Plant Pathogenic Bacteria The results of antibacterial spectrum determination showed that fermentation broth of strain Sa-21 had a strong inhibiting effect on 8 representative plant pathogenic bacteria of *Pseudomonas syringae* pv. *tomato*, *Xanthomonas campestris* pv. *glycines*, *Pseudomonas syringae* pv. *glycinea*, *Xanthomonas oryzae* pv. *oryzicola*, and *Xanthomonas campestris* pv. *campestris* (Table 4),

TABLE 4

Inhibiting effect of fermentation filtrate of *Streptomyces* strain Sa-21 on 8 species of plant pathogenic bacteria

| 8 plant pathogenic bacteria | Zone of inhibition/min |
| --- | --- |
| *Xanthomonas campestris* pv. *glycines* | 53.8 ± 1.5 |
| *Xanthomonas oryzae* pv. *oryzicola* | 51.0 ± 2.2 |
| *Pseudomonas syringae* pv. *glycinea* | 45.4 ± 2.8 |
| *Ralstonia solanacearum* | 40.5 ± 1.5 |
| *Xanthomonas campestris* pv. *campestris* | 38.7 ± 2.3 |
| *Pseudomonas syringae* pv. *tomato* | 35.4 ± 1.9 |
| *Pseudomonas syringae* pv. *tabaci* | 30.5 ± 1.9 |
| *Xanthomonas oryzae* pv. *oryzae* | 20.9 ± 2.1 |

The inventors of the present disclosure found in the experiment that *Streptomyces sioyaensis* 107, *Streptomyces* sp. lnu-12, and *Streptomyces cocoa* FN had a very poor antibacterial effect on the above 8 species of plant pathogenic bacteria, which was far poorer than the present disclosure. *Streptomyces albidoflavus* SY-FX-14 had a very poor antibacterial effect on plant pathogenic bacteria such as *Xanthomonas oryzae* pv. *oryzicola*, *Xanthomonas oryzae* pv, *oryzicola* and *Pseudomonas syringae* pv. *glycinea*, which was far poorer than the present disclosure.

Example 3

Study of Preventive Effect of Fermentation Filtrate of *Streptomyces* Strain Sa-21 on Tomato Early Blight Germs and tomato varieties Antagonistic actinomycetes: *Streptomyces antioxidans* strain Sa-21.

Pathogen: *Alternaria solani* (abbreviated as *As* hereinafter)

Tomato varieties: the choice of tomato early blight susceptibility of 3 tomato varieties (Micro Tom, Jinzhu (golden pearl variety), Yafei No. 1).

Medium

Gauze's synthetic solid medium and Gauze's synthetic broth medium, used for cultivation and fermentation of the strain Sa-21.

PDA culture medium, used for cultivation of *As*.

Experimental Methods 3.1 Cultivation of Tomato Seedlings

The full tomato seeds having average size were placed in 75% alcohol for 30 s surface disinfection, and then washed with sterile water 5 or more times. The disinfected seeds were uniformly placed in sterile petri. dishes (approximately 50 grains for each dish) with a piece of filter paper spread in it. Five milliliter of sterile water was added to each dish, and the seeds were cultivated at 26° C. in dark till the seeds started to bud, The seeds were sown in potted soil, placed in a light incubator and cultivated for 40 days. Cultivation conditions: light illumination for 14 h, temperature at 26° C., dark cultivation for 10 h, temperature at 24° C., and humidity 65%. The seeds were watered every morning and sprayed with nutrient solution once every two weeks.

3.2 Cultivation of *Aliternaria solani*

The As fungi were inoculated in PDA culture medium in a dot-to-dot manner and cultivated in an incubator at 28° C. until colonies covered surface of the medium, then a 3 mm hole was punched using a hole puncher "*As* disk" for later use.

3.3 Preparation of Diluted Solution of Strain Sa-21 Fermentation Filtrate

The Sa.-21 strain was inoculated in Gauze's synthetic solid medium No. 1, cultured for 5 days, 2 Sa-21 antimicrobial disks (diameter 6 mm) taken by a fetch puncher was inoculated in 100 mL (Erlenmeyer flask specifications 250 mL) Gauze's synthetic broth medium, the initial pH value was 7.4. The resulting mixture was cultured for 72 hours at a temperature of 28° C. and at a rotation speed of 160 r/min to obtain seed culture. The seed culture was inoculated into Gauze's synthetic broth medium (the Erlenmeyer flask size was 250 mL in specification, in which 100 mL of Gauze's synthetic broth medium was filled) in an inoculation amount of 10% of the seed culture, and the resulting mixture was cultured for 7 days under the same conditions to afford the fermentation broth. The fermentation broth was placed in a 50 mL centrifuge tube and centrifuged for 10 min at 12000 r/min, and the supernatant was filtered through a 0.22 μm organic membrane to remove residual spores, giving fermentation filtrate. The fermentation filtrate was diluted based on a. volume ratio of water:fermentation filtrate=9:1 to obtain the diluted solution of fermentation filtrate.

3.4 Preliminary Study on Control Efficacy for Potted Plant 3.4.1 Inoculation and Treatment of *As*

Four healthy leaves were chosen from each tomato seedling and a wound on the backside of the leaves was made by slipping with an inoculation needle. The *As* disk was applied at the wound repeatedly for 5 times, and the *As* disk (3 mm) was fixed at the wound with a plastic film, and each *As* disk was inoculated on one leaf and moisturized for 24 h. The potted plants were placed in a light incubator and incubated at 26° C., the *As* disk along with the plastic film was removed after 7 days, and the incidence of disease was counted.

In the experiment, a control group (CK) and a treatment group (T) were set. For every 10 treated biological replicates:

Blank control (CK1): only 3 mm agar bulks were inoculated;

Inoculation control (CK2): only *As* disk (3 mm) was inoculated;

Treatment 1 group (T1): the diluted solution of fermented filtrate was sprayed on the tomato leaves until the first drop of liquid dripped from the leaves, and the spraying was repeated 6 times with an interval of half an hour between two sprays. After 6 hours, the *As* disk was inoculated on the wounds of the tomato leaves;

Treatment group 2 (T2): Firstly *As* disk was inoculated on the wounds of the tomato leaves, 6 hours later, the diluted solution of fermented filtrate was sprayed on the tomato leaves until the first drop of liquid dripped from the leaves, the spraying was repeated 6 times with an interval of half an hour between two sprays;

Treatment group 3 (T3): the fermented filtrate was irrigated into the soil until the soil became wet, and the diluted solution of the fermented filtrate was sprayed on the tomato leaves until the first liquid dripped from the leaves. The spraying was repeated 3 times with an interval of one hour between two spraying. Six hours later, the As disk was inoculated on the wound of the tomato leaves.

When the development of the disease became stable, the incidence of disease was recorded and counted. The disease condition was investigated on a leaf basis, and the disease condition of tomato early blight was divided into 0 to 4 grades as follows:

Grade 0: No spots;

Grade 1: The area of diseased spots accounts for less than ¼ of the area of pinnate leaves;

Grade 2: The area of diseased spots accounts for ¼ to ½ of the area of pinnate leaves;

Grade 3: The area of diseased spots accounts for ½ to ¾ of the area. of pinnate leaves, and nearly half of the leaflets were dead;

Grade 4: The area of diseased spots accounts for more than ¾ of the area of pinnate leaves, and more than half or all of the leaflets were dead.

Disease index=Σ(disease grade×number of plants for each grade)/(4×total number of plants)×100

Relative control efficacy (%)=(CK2 disease severity−treated disease severity)/CK2 disease severity×100%

Experimental Results

The experimental results are shown in Table 5. Treatment of fermentation filtrate of strain Sa-21 significantly reduced the disease index of tomato early blight. In treatment 3, better control efficacy on tomato early blight was obtained, and the control efficacy for Micro Tom (variety of small tomato), Jinzhu, Yafei No.1 reached 90% or above, i.e., when the diluted solution of fermentation filtrate were simultaneously poured in the soil and sprayed on the leaves, the best control efficacy was obtained.

TABLE 5

Relative control efficacy of the fermentation filtrate of Actinomyces strain Sa-21 on tomato early blight
Relative control efficacy (%)

| Treatment group | Micro Tom | Jinzhu | Yafei No. 1 |
|---|---|---|---|
| T1 | 65.18 ± 2.32 b | 66.75 ± 1.31 b | 69.30 ± 1.95 b |
| T2 | 46.81 ± 1.89 c | 46.44 ± 2.19 c | 45.07 ± 1.56 c |
| T3 | 91.26 ± 1.63 a | 92.14 ± 2.13 a | 92.86 ± 1.02 a |

Note: Different lowercase letters indicate significant differences at $P < 0.05$ level Finally, it should be noted that the above-described are merely a few specific etribodiments of the present disclosure. Apparently; the present disclosure is not limited to the above embodiments, and many variations are possible. All variations that can be directly derived or conceived based on the content disclosed by the present disclosure by those of ordinary skill in the art should be considered to fall within the protection scope of the present disclosure.

What is claimed is:

1. A method for inhibiting *Alternaria solani* (*A. solani*), wherein the method comprises a step of contacting *Alternaria solani* with the *Streptomyces antioxidans* strain Sa-21, and the *Streptomyces antioxidans* strain Sa-21 deposited with the China Center for Type Culture Collection under the accession number of CCTCC NO: M2020423.

2. The method according to claim 1, wherein the *Streptomyces antioxidans* strain Sa-21 has an inhibiting effect on both plant pathogenic fungi and plant pathogenic bacteria.

3. The method according to claim 2, wherein the plant pathogenic fungi are selected from the group consisting of *Fusarium solani, Fusariumoxysporum* f. sp. *momordicae, Botryosphaeria berengeriana* f. sp *piricola*, and *Colletotrichum lagenerium*; and the plant pathogenic bacteria are selected from the group consisting of *Pseudomonas syringae* pv. tomato, *Xanthomonas campestris* pv. glycines, *Pseudomonas syringae* pv. *glycinea, Xanthomonas oryzae* pv. *oryzicola, Xanthomonas campestris* pv. *campestris, Ralstonia solanacearum, Pseudomonas syringae* pv. *tabaci*, and *Xanthomonas oryzae* pv. *oryzae*.

* * * * *

SEQUENCE LISTING

<160> NUMBER OF SEQ ID NOS: 1

<210> SEQ ID NO 1
<211> LENGTH: 1406
<212> TYPE: DNA
<213> ORGANISM: Artificial Sequence
<220> FEATURE:
<223> OTHER INFORMATION: Sequence of 16S rDNA

<400> SEQUENCE: 1

| | | | | | | |
|---|---|---|---|---|---|---|
| aaacatgcag | tcgaacgatg | aaccggtttc | ggccggggat | tagtggcgaa | cgggtgagta | 60 |
| acacgtgggc | aatctgccct | gcactctggg | acaagccctg | gaaacggggt | ctaataccgg | 120 |
| atatgactgc | cgaccgcatg | gtctggtggt | ggaaagctcc | ggcggtgcag | gatgagcccg | 180 |
| cggcctatca | gcttgttggt | ggggtgatgg | cctaccaagg | cgacgacggg | tagccggcct | 240 |
| gagagggcga | ccggccacac | tgggactgag | acacggccca | gactcctacg | ggaggcagca | 300 |
| gtggggaata | ttgcacaatg | ggcgcaagcc | tgatgcagcg | acgccgcgtg | agggatgacg | 360 |
| gccttcgggt | tgtaaacctc | tttcagcagg | gaagaagcgc | gagtgacggt | acctgcagaa | 420 |
| gaagcgccgg | ctaactacgt | gccagcagcc | gcggtaatac | gtagggcgca | agcgttgtcc | 480 |
| ggaattattg | ggcgtaaaga | gctcgtaggc | ggcttgtcgc | gtcggatgtg | aaagcccggg | 540 |
| gcttaactcc | gggtctgcat | tcgatacggg | caggctagag | ttcggtaggg | gagatcggaa | 600 |
| ttcctggtgt | agcggtgaaa | tgcgcagata | tcaggaggaa | caccggtggc | gaaggcggat | 660 |
| ctctgggccg | atactgacgc | tgaggagcga | aagcgtgggg | agcgaacagg | attagatacc | 720 |
| ctggtagtcc | acgccgtaaa | cgttgggaac | taggtgtggg | cgacattcca | cgttgtccgt | 780 |
| gccgcagcta | acgcattaag | ttccccgcct | ggggagtacg | gccgcaaggc | taaaactcaa | 840 |
| aggaattgac | ggggcccgc | acaagcggcg | gagcatgtgg | cttaattcga | cgcaacgcga | 900 |
| agaaccttac | caaggcttga | catacaccgg | aaaactctgg | agacagggtc | cccttgtgg | 960 |
| tcggtgtaca | ggtggtgcat | ggctgtcgtc | agctcgtgtc | gtgagatgtt | gggttaagtc | 1020 |

```
ccgcaacgag cgcaaccctt gttctgtgtt gccagcatgc ctttcggggt gatggggact   1080
cacaggagac tgccggggtc aactcggagg aaggtgggga cgacgtcaag tcatcatgcc   1140
ccttatgtct tgggctgcac acgtgctaca atggccggta caatgagctg cgaagccgtg   1200
aggtggagcg aatctcaaaa agccggtctc agttcggatt ggggtctgca actcgacccc   1260
atgaagtcgg agtcgctagt aatcgcagat cagcattgct gcggtgaata cgttcccggg   1320
ccttgtacac accgcccgtc acgtcacgaa agtcggtaac acccgaagcc ggttggccca   1380
acccttgtgg agggagccgt cgaaag                                        1406
```